United States Patent
Stringer

(10) Patent No.: US 7,222,817 B2
(45) Date of Patent: May 29, 2007

(54) CART HANDLE COVER SYSTEM

(76) Inventor: Claude A. Stringer, 1003 Graystone Dr., Winston-Salem, NC (US) 27105

( * ) Notice: Subject to any disclaimer, the term of this patent is extended or adjusted under 35 U.S.C. 154(b) by 331 days.

(21) Appl. No.: 10/967,802

(22) Filed: Oct. 18, 2004

(65) Prior Publication Data

US 2006/0151660 A1    Jul. 13, 2006

(51) Int. Cl.
  *B65H 75/02* (2006.01)
(52) U.S. Cl. .................. 242/588.3; 242/594.5
(58) Field of Classification Search ............ 242/160.1, 242/160.4, 594, 594.5, 594.6, 588, 588.3, 242/588.6
See application file for complete search history.

(56) References Cited

U.S. PATENT DOCUMENTS

| | | | |
|---|---|---|---|
| 3,050,185 A | * | 8/1962 | Crain |
| 3,999,221 A | * | 12/1976 | Hannigan |
| 4,570,794 A | * | 2/1986 | Capitao, Jr. |
| 4,807,753 A | * | 2/1989 | Goldstein |
| 5,215,319 A | | 6/1993 | Farris |
| 5,427,392 A | | 6/1995 | Duer |
| 5,429,377 A | | 7/1995 | Duer |
| 5,507,386 A | * | 4/1996 | Foote |
| 5,678,888 A | | 10/1997 | Sowell et al. |
| 5,715,571 A | | 2/1998 | Fasano |
| 5,722,672 A | | 3/1998 | Frederick |
| 5,820,142 A | | 10/1998 | Duer |
| 5,953,790 A | | 9/1999 | Auxier |
| 6,065,764 A | | 5/2000 | Moseley |
| 6,491,996 B2 | | 12/2002 | Digangi |
| 6,543,794 B1 | | 4/2003 | Tyree |
| 6,832,766 B2 | | 12/2004 | Stokes |
| 6,851,750 B2 | | 2/2005 | Sampson et al. |
| 6,929,326 B2 | | 8/2005 | Cohen-Fyffe |
| 6,948,725 B2 | | 9/2005 | Sampson et al. |
| 2003/0155727 A1 | | 8/2003 | Pettigrew et al. |
| 2004/0021279 A1 | * | 2/2004 | Sobo et al. |
| 2005/0218612 A1 | * | 10/2005 | Malchow |

* cited by examiner

*Primary Examiner*—William A. Rivera
(74) *Attorney, Agent, or Firm*—Kilpatrick Stockton LLP

(57) ABSTRACT

A cart handle cover system includes a roll of cart handle covers contained within a dispenser for dispensing the covers from the roll. One or more rolls of covers are rotatingly positioned about a roll support rod inside the dispenser. The dispenser includes a dispensing slot near the top on one side of the dispenser. When the roll of covers is advanced through the dispensing slot, a user can peel one of the covers from the roll for application to a cart handle. Accordingly, a sanitary barrier for protecting customers' hands from potential contaminants on a shopping cart handle can be conveniently provided to customers in a retail store.

12 Claims, 8 Drawing Sheets

CART HANDLE COVER SYSTEM

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention relates to a cart handle cover system. An embodiment of the present invention includes a roll of cart handle covers adapted to be dispensed from a dispenser to conveniently provide a sanitary barrier for protecting customers' hands from potential contaminants on a shopping cart handle.

BACKGROUND OF THE INVENTION

Much of the public shops at retail stores, such as grocery stores and discount stores, where shopping carts are used. The handle of a shopping cart is typically tubular in shape and made from a metal or plastic. The shopping carts are used repeatedly each day by a number of different shoppers, and generally are not cleaned between uses. As such, shopping cart handles can serve as important vectors of infectious microorganisms between customers. Such infectious microorganisms include disease-causing bacteria and viruses.

Infants and young children are especially at risk for contamination as they are placed in the seat of the shopping cart. Infants and children often put their hands in their mouths after having them on the cart handle and/or they put their mouths directly on the handle. In this manner, pathogenic microorganisms can be transmitted from a previous cart user to subsequent at-risk persons.

The risk for potential contamination from shopping cart handles in grocery stores is further increased. Because of lapses in adherence to farming standards and because such standards can be lower in other countries, native and imported vegetables can be contaminated with potentially dangerous pathogenic microorganisms. For example, one recent food-borne outbreak resulted in the death of three people and infection of hundreds more with Hepatitis A from scallions imported from Mexico. There have also been outbreaks related to contamination with Cyclospora bacteria of raspberries from Guatemala and with Salmonella of tomatoes from the U.S. and cantaloupes from Mexico. As a consequence of touching such contaminated vegetables in a grocery store and then touching a shopping cart handle, spread of pathogenic microorganisms can occur by physical transfer.

Moreover, research has shown that infectious microbes can live far longer on dry, inanimate surfaces, such as plastic and fabrics, than once thought. Thus, the risk of infectious contamination from shopping cart handles is an increasing concern to both retail stores and to their patrons.

To remedy this situation, a store could sanitize the handle of each shopping cart after each use. This however, would be an unrealistic solution, as several customers handle each of the store's scores of shopping carts daily. To implement such a sanitation program would be costly and time-consuming for the store. Shoppers have the option of taking cleansing materials to a store to clean shopping cart handles prior to use. This option is inconvenient for shoppers. While a shopper could wear gloves to protect himself from the cart handle, this would be inconvenient, costly, and would not prevent a child from teething on or otherwise contacting as exposed handle.

Various covers for shopping cart handles have been proposed. However, such covers do not provide for convenient dispensing of the covers that will ensure that a cover is always available when shopping.

Thus, there is a need to provide a cart handle cover system that provides cart handle covers in a convenient, inexpensive, and effective manner.

SUMMARY OF THE INVENTION

In embodiments of the present invention, a cart handle cover system includes a roll of cart handle covers contained within a dispenser for dispensing the covers from the roll. One or more rolls of covers are rotatingly positioned about a roll support rod inside the dispenser. The dispenser includes a dispensing slot near the top on one side of the dispenser. When the roll of covers is advanced through the dispensing slot, a user can peel one of the covers from the roll for application to a cart handle. In this manner, a sanitary barrier for protecting customers' hands from potential contaminants on a shopping cart handle can be conveniently provided to customers in a retail store.

A cart handle cover system can include a plurality of cart handle covers formed from a continuous strip of cover material having an adhesive applied to a back side of the cover material. The back side of the cover material is releasably adhered to a backing material. The continuous strip of cover material may be wrapped about a tubular core to form a roll. The continuous strip of cover material is scored to form the plurality of cart handle covers, which can be peeled from the backing material. In embodiments, the continuous strip of cover material comprises a marking at the end of each one of the covers to indicate the distance for advancing the strip in order to peel a single cover from the backing material. The covers can be various sizes to cover different sizes of cart handles. Each cover has a predetermined size sufficient to completely cover a particular cart handle. In embodiments, the cart handle covers are disposable.

Embodiments of the present invention include at least two rod support members spaced apart inside a dispenser. Each rod support member has a centrally-located cut-out. A roll support rod extends through the cut-outs of the rod support members along a length of the dispenser. The roll support rod is adapted for the tubular core of the roll of handle covers to be rotatingly positioned about the roll support rod. The shape of the cut-outs in the rod support members and the shape of the roll support rod is preferably the same shape.

In embodiments, the dispenser includes a dispensing slot near the top on one side along the length of the dispenser. The dispenser and the dispenser slot can each have a length sufficient to contain a plurality of rolls of handle covers. When the continuous strip of handle covers is advanced through the dispensing slot, a user can peel one of the covers from the backing material for application to a cart handle.

Embodiments of the present invention include advertising information displayed on the cart handle covers and/or the dispenser.

The present invention includes embodiments of a combination cart handle cover and baby cradle portion.

In embodiments of the present invention, the dispenser comprises a portable dispenser sized to fit inside a purse. In such a portable (personal-sized) dispenser, the dispenser contains only the roll of cart handle covers, and not a roll support rod or rod support members. The roll contains a small number of covers, for example 10-30 covers.

The present invention includes a method for protecting against cross-contamination from shopping cart handles. Such a method includes providing a plurality of cart handle covers formed from a continuous strip of cover material. The cover material has an adhesive applied to a back side of the cover material, and the back side of the cover material is releasably adhered to a backing material. The continuous strip of cover material is wrapped about a tubular core to form a roll. A dispenser for dispensing the covers from the roll includes at least two rod support members spaced apart inside the dispenser, each rod support member having a centrally-located cut-out. A roll support rod extends through the cut-outs of the rod support members along a length of the dispenser, and the tubular core of the roll of handle covers is rotatingly positioned about the roll support rod. A dispensing slot is located near the top on one side along the length of the dispenser. Such a method includes advancing the continuous strip of handle covers through the dispensing slot, peeling one of the covers from the backing material, and applying the cover to a cart handle.

Features of a cart handle cover system of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A cart handle cover system of the present invention provides numerous advantages over prior approaches to providing protection from cross-contamination from shopping cart handles. For example, the present invention advantageously includes a cart handle cover system that provides a disposable, low cost handle cover that may be placed over the handle of a shopping cart prior to use by each individual patron.

Another advantage is that the present invention provides a method for protecting against cross-contamination from shopping cart handles by providing a convenient means for obtaining a cart handle cover and covering the handle of a shopping cart with the cover barrier prior to use of the cart.

Another advantage is that the present invention provides a temporary, disposable cart handle cover that can be dispensed at the entrance to a store to those patrons desiring to make use of such covering to protect them from possible contamination from prior customers.

Another advantage is that the present invention provides provide a portable cart handle cover that can be carried handily in a purse or the like from store to store.

Another advantage is that the present invention provides cart handle cover that is easy to apply and remove.

Another advantage is that the present invention provides a cart handle cover system that can be utilized by a retail store to show its interest in providing a safe, healthy environment for shopping to its customers.

Another advantage is that the present invention provides a cart handle cover system that can be utilized by a retail store to recover its costs for, or to profit from, providing individual sanitary cart handle covers for its customers.

As will be realized by those of skill in the art, many different embodiments of a cart handle cover system according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Figure 1:
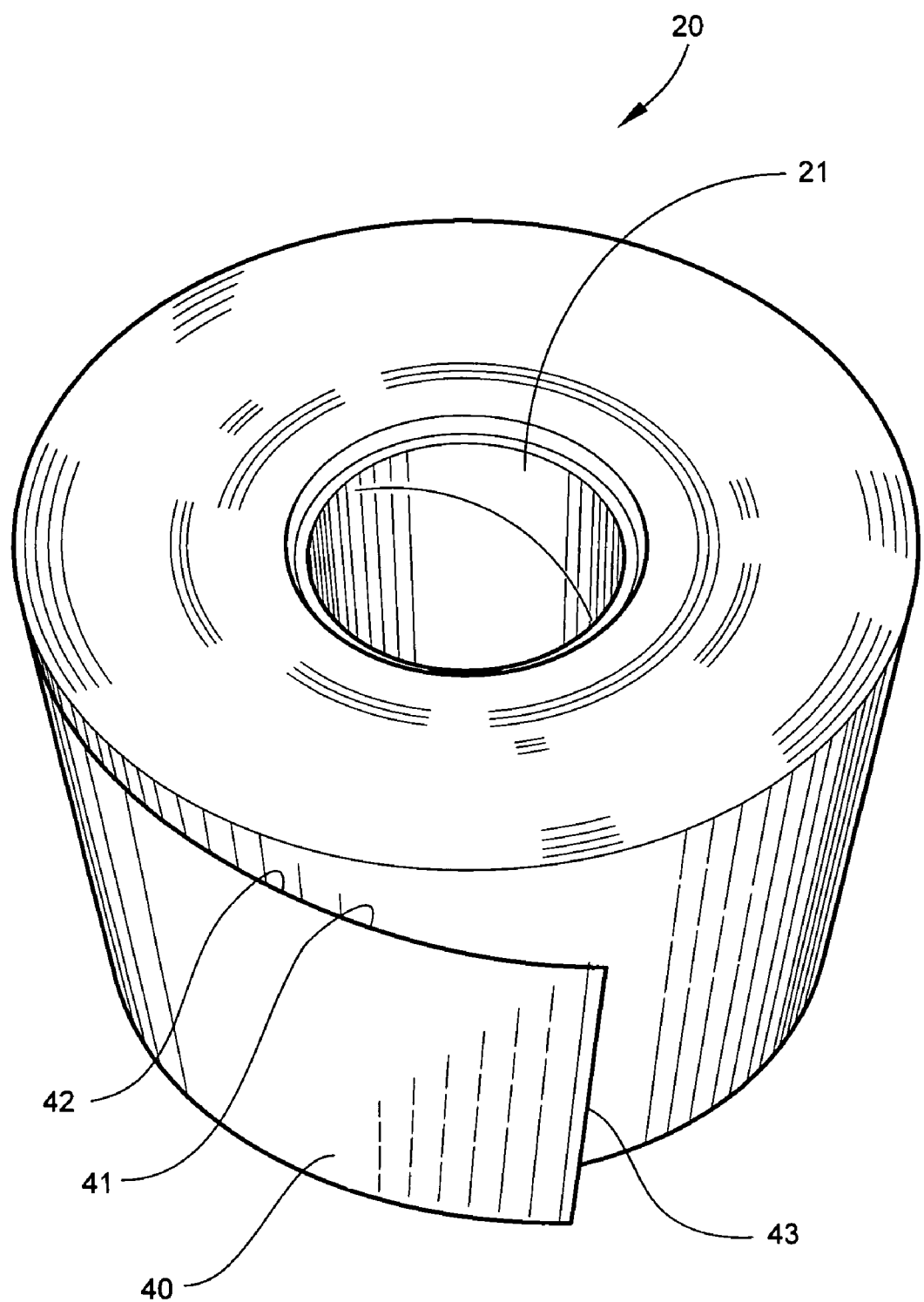
FIG. 1 is a perspective view of a continuous strip of cart handle covers is a roll in an embodiment of the present invention.

FIGS. 1-8 illustrate embodiments of the present invention. In such embodiments, a cart handle cover system 10 includes a roll 20 of cart handle covers 30 contained within a dispenser 50 for dispensing the covers 30 from the roll 20. One or more rolls 20 of covers 30 are rotatingly positioned about a roll support rod 70 inside the dispenser 50. The dispenser 50 includes a dispensing slot 55 near the top 52 on one side 53 of the dispenser 50. When the roll 20 of covers 30 is advanced through the dispensing slot 55, a user can peel one of the covers 30 from the roll 20 for application to a cart handle. In this manner, a sanitary barrier for protecting customers' hands from potential contaminants on a shopping cart handle can be conveniently provided to customers in a retail store.

Figure 2:
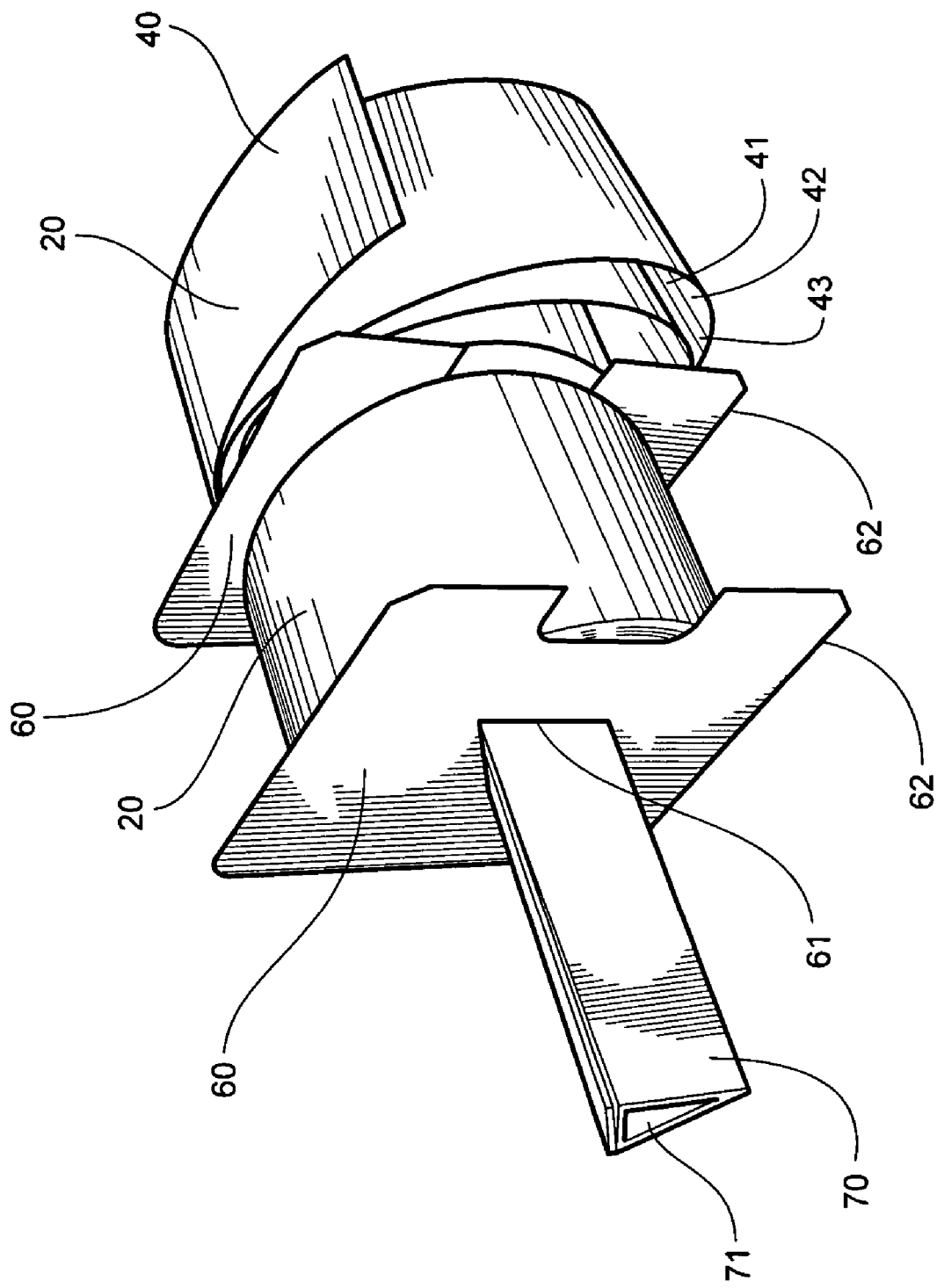
FIG. 2 is a perspective view of two rolls of cart handle covers as shown in FIG. 1 mounted on a roll support rod and adjacent rod support members in an embodiment of the present invention.

As shown in FIGS. 1 and 2, embodiments of a cart handle cover system 10 can include a plurality of cart handle covers 30 formed from a continuous strip of cover material 40. The cover material 40 has an adhesive 41 applied to its back side 42. The back side 42 of the cover material 40 is releasably adhered to a backing material 43. The continuous strip of cover material 40 is wrapped about a tubular core 21 to form a roll 20. The backing material 43 keeps the cover 30 from sticking to itself due to the adhesive 41 when the cover material 40 is wound into a roll 20. When the continuous strip 40 is pulled away from the roll 20, individual covers 30 can be peeled from the backing material 43 for application to a cart handle.

Figure 3:
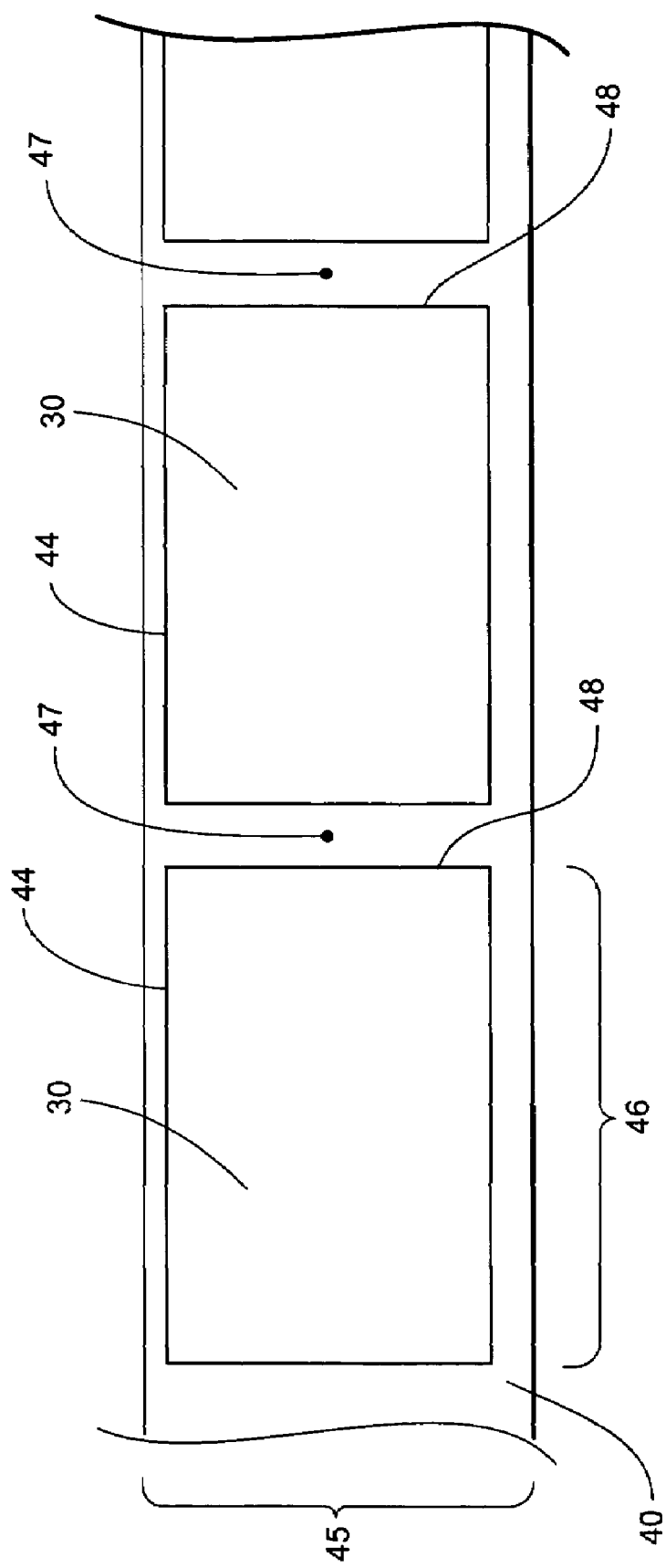
FIG. 3 is a fragmented view of a continuous strip of cart handle covers showing a marking indicator at the end of each individual cart handle cover in an embodiment of the present invention.

The continuous strip of cover material 40 can be scored 44 to form the plurality of cart handle covers 30, as shown in FIG. 3, on a roll 20 of cover material 40 and backing material 43. The covers 30 can be scored 44 to have a predetermined size. The size of cart handle covers 30 can be customized to fit a particular diameter and length of handle. The predetermined size can comprise a width 45 and a length 46 sufficient to completely cover a particular cart handle so as to leave no uncovered portion of the handle. For example, a common tubular shopping cart handle is less than 10 inches in circumference. As such, cart handle covers 30 of the present invention having a width of approximately 10 inches would completely cover the circumference of such a cart handle.

In embodiments, the cover material 40 from which the cart handle covers 30 are made can be a paper product. Alternatively, the cover material 40 and cart handle covers 30 can comprise plastic, aluminum, or other flexible, substantially impervious material suitable for forming in a roll 20 and applying to a cart handle. As shown in FIG. 2, the tubular core 21 of the roll 20 of handle covers 30 can be a corrugated cardboard tube, or it can be made of other material, such as plastic. The roll 20 of handle covers 30 can include any number of individual handle covers 30, for example 300 or more covers 30.

The cover material 40 has an adhesive 41 applied to its back side 42. The adhesive back side 42 of the cover 30 allows the cover 30 to remain attached to a cart handle when applied. The type and amount of adhesive 41 on the back side 42 of a cover 30 is sufficient to cause the cover 30 to adhere to a cart handle for the duration of a shopper's use. However, the type and amount of adhesive 41 is such that a cover 30 can easily be removed from a cart handle by manually peeling the cover 30 away from the handle with light force.

The continuous strip of cover material 40 can include an indicator marking 47 at the end 48 of each of the individual covers 30 to indicate the distance for advancing the strip 40 in order to have access to a single cover 30 such that the cover 30 could be peeled from the backing material 43. Such a marking 47 indicates to a user when to stop pulling the strip 40 from a dispenser 50. For example, as shown in FIG. 3, an indicator marking 47, or dot, is placed after the end 48 of each individual handle cover 30. The indicator marking 47 can also have a color different than the color of the cover material 40 so that the marking 47 would stand out to a user.

In another aspect of the present invention, embodiments include a dispenser 50 for dispensing covers 30 from a roll 20. A dispenser 50 can be sized to contain and dispense a single roll 20 of handle covers 30, or it can comprise a length 51 sufficient to contain and dispense a plurality of rolls 20 of handle covers 30. For example, the embodiments of a dispenser 50 shown in FIGS. 4-7 have a length 51 that will accommodate three rolls 20 of handle covers 30.

Figure 6:
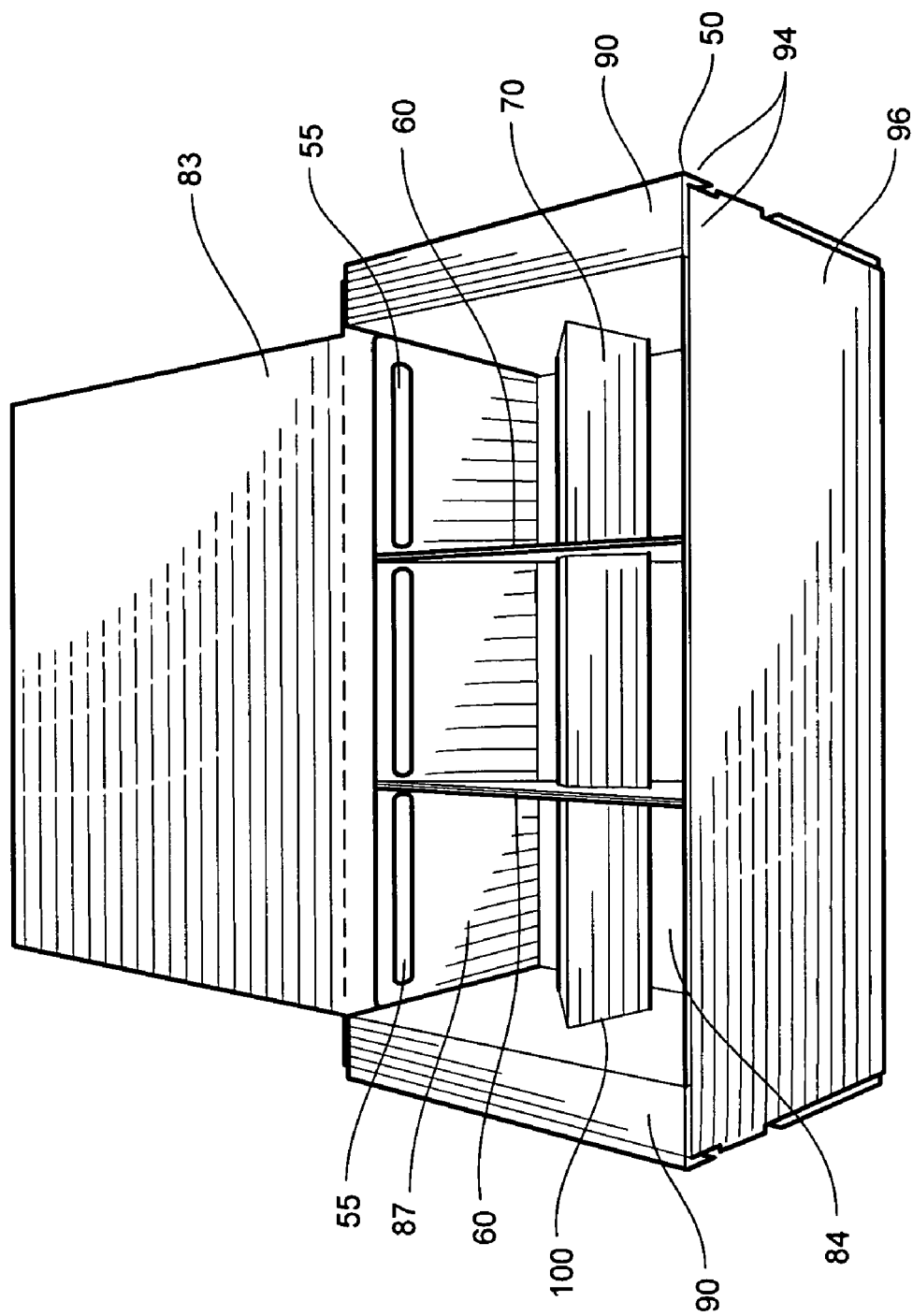
FIG. 6 is a top perspective view of the inside of an assembled dispenser without rolls of cart handle covers in an embodiment of the present invention.

As shown in FIGS. 2 and 6, a dispenser 50 of the present invention includes at least two rod support members 60 spaced apart inside and along the length 51 of the dispenser 50. Each rod support member 60 has a centrally-located cut-out 61. When the two rod support members 60 are stood on edge 62, the cut-outs 61 align along the length 51 of the dispenser 50. Generally, a rod support member 60 is placed between each roll 20 of handle covers 30. The rod support members 60 can be made of the same material as the dispenser 50, for example, a corrugated cardboard. In addition to supporting a rod, the rod support members 60 keep the edges of adjacent rolls 20 from rubbing against each other during use.

Figure 7:
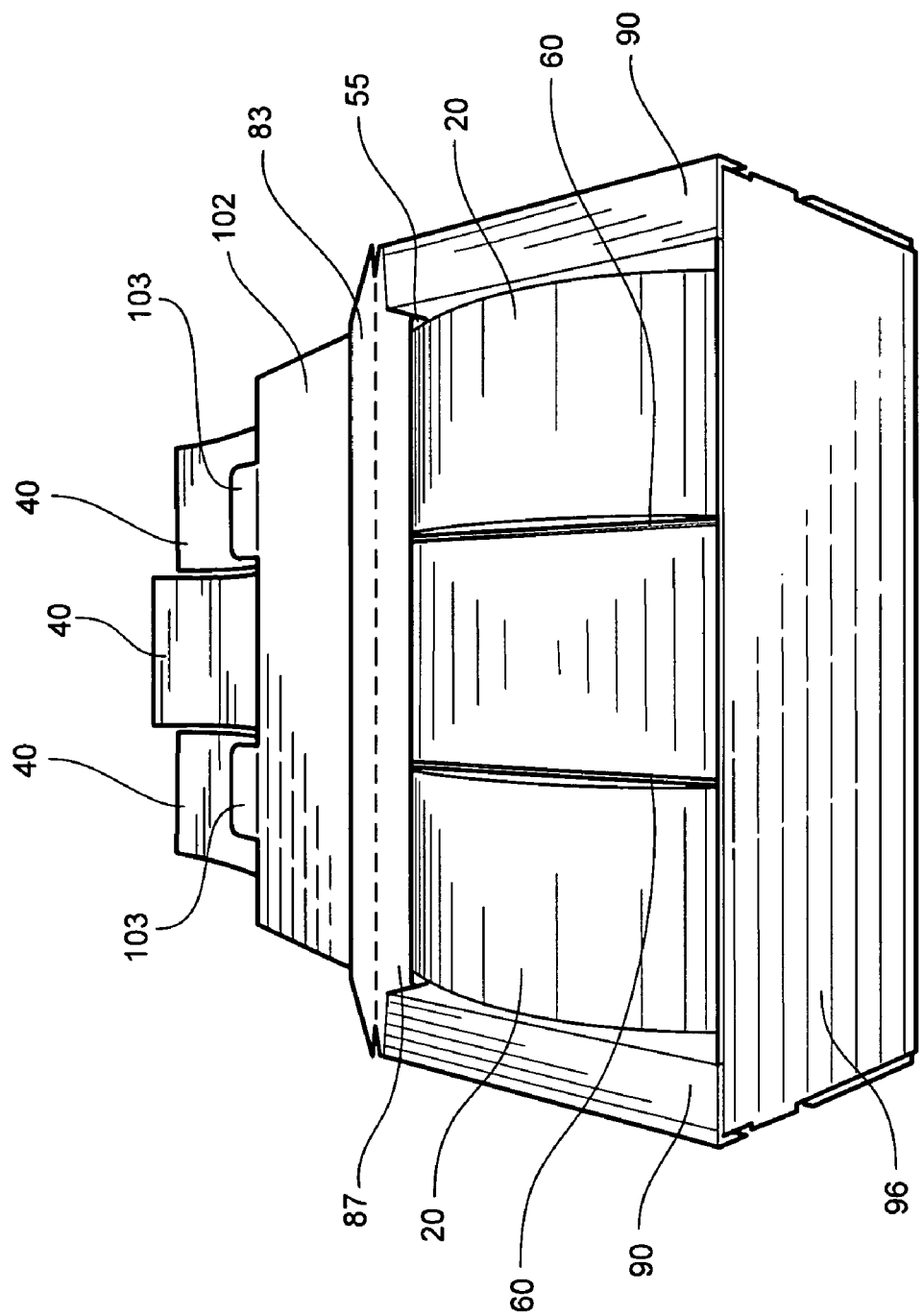
FIG. 7 is a top perspective view of the dispenser shown in FIG. 6, having three rolls of cart handle covers rotatingly mounted in the dispenser.

A roll support rod 70 extends through the cut-outs 61 of the rod support members 60 along the length 51 of the dispenser 50. The tubular core 21 of a roll 20 of handle covers 30 is positioned about the roll support rod 70 such that the roll 20 can rotate when the strip of covers 40 is pulled away from the roll 20. In embodiments, as shown in FIGS. 6 and 7, the roll support rod 70 has a shape 71 that is the same geometric configuration as the cut-outs 61 in the rod support members 60. By the rod support member cut-outs 61 and the roll support rod 70 having the same shape, the roll support rod 70 remains stationary and does not turn when the continuous strip of covers 40 is pulled away from a roll 20 of covers 30.

Figure 4:
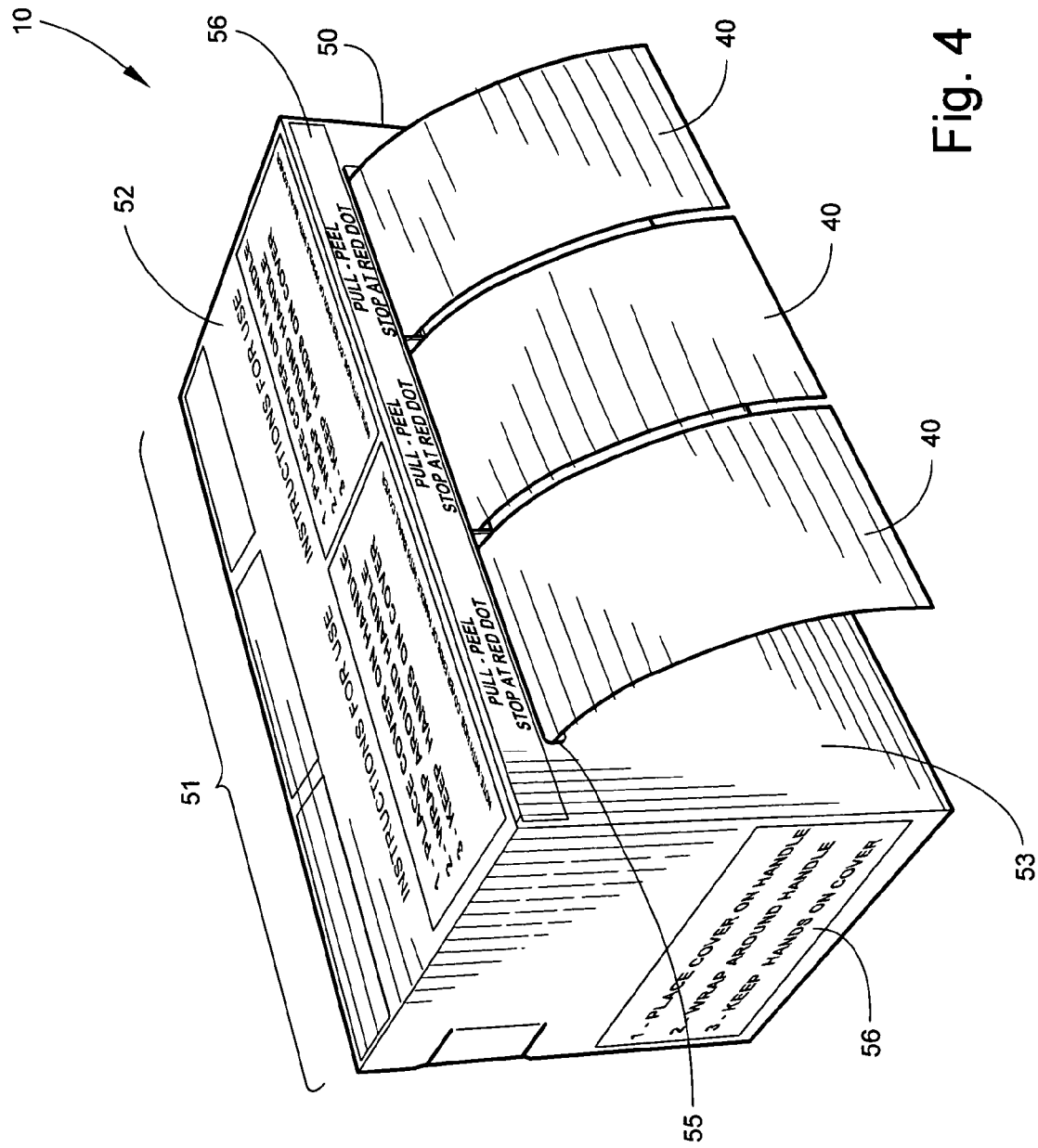
FIG. 4 is a perspective view of a cart handle cover dispenser showing continuous strips of cart handle covers advanced through dispensing slots from three rolls of covers in an embodiment of the present invention.
Figure 5:
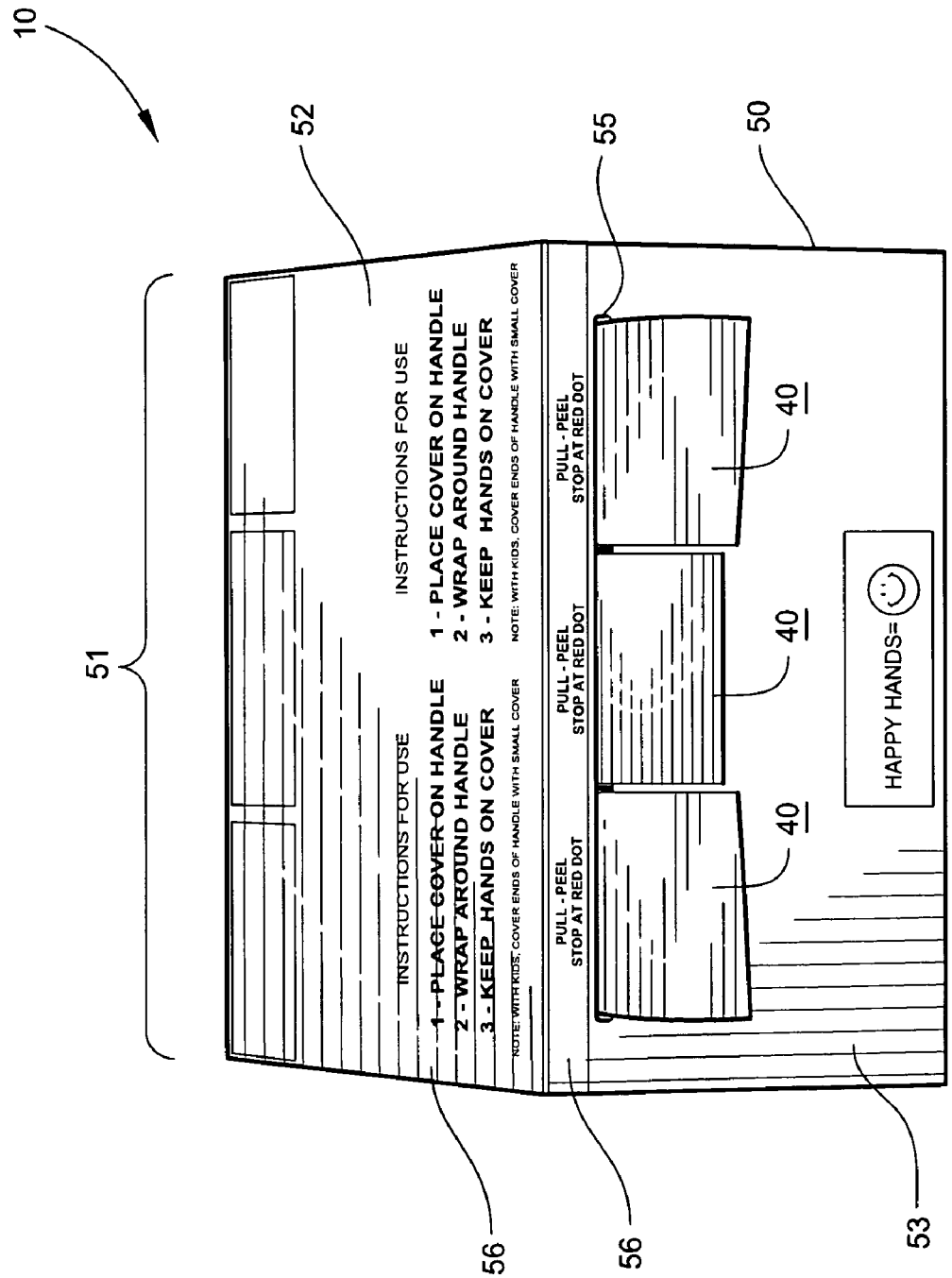
FIG. 5 is a front perspective view of the embodiment of a dispenser shown in FIG. 4.

Embodiments of a dispenser 50 of the present invention can include a dispensing slot 55 near the top 52 of one side 53 along the length 51 of the dispenser 50, as shown in FIGS. 4-6. The dispensing slot 55 is sized so as to allow the continuous strip of cover material 40 and backing material 43 to be pulled from a roll 20 through the slot 55. The dispensing slot 55 is positioned near the top 52 of the side 53 of the dispenser 50 so that once the continuous strip of cover material 40 and backing material 43 is pulled through the slot 55, the strip of material 40 outside the dispenser 50 is maintained outside the dispenser 50. This allows subsequent users to advance the strip of material 40 through the dispensing slot 55 to obtain a handle cover 30.

As shown in FIGS. 4 and 5, embodiments of a dispenser 50 of the present invention can include instructional information 56 on the exterior surfaces of the dispenser 50. For example, the dispenser 50 can include the directions for use of the cart handle cover system 10. Such instructions 56 may state, for example, "Pull-Peel" and "Stop at red dot" above the dispenser slot. Elsewhere on the dispenser 50, directions may state "Place cover on handle", "Wrap around handle", and "Keep hands on cover". Instructional information 56 may be tailored for a particular retail environment and/or cart handle.

Figure 8:
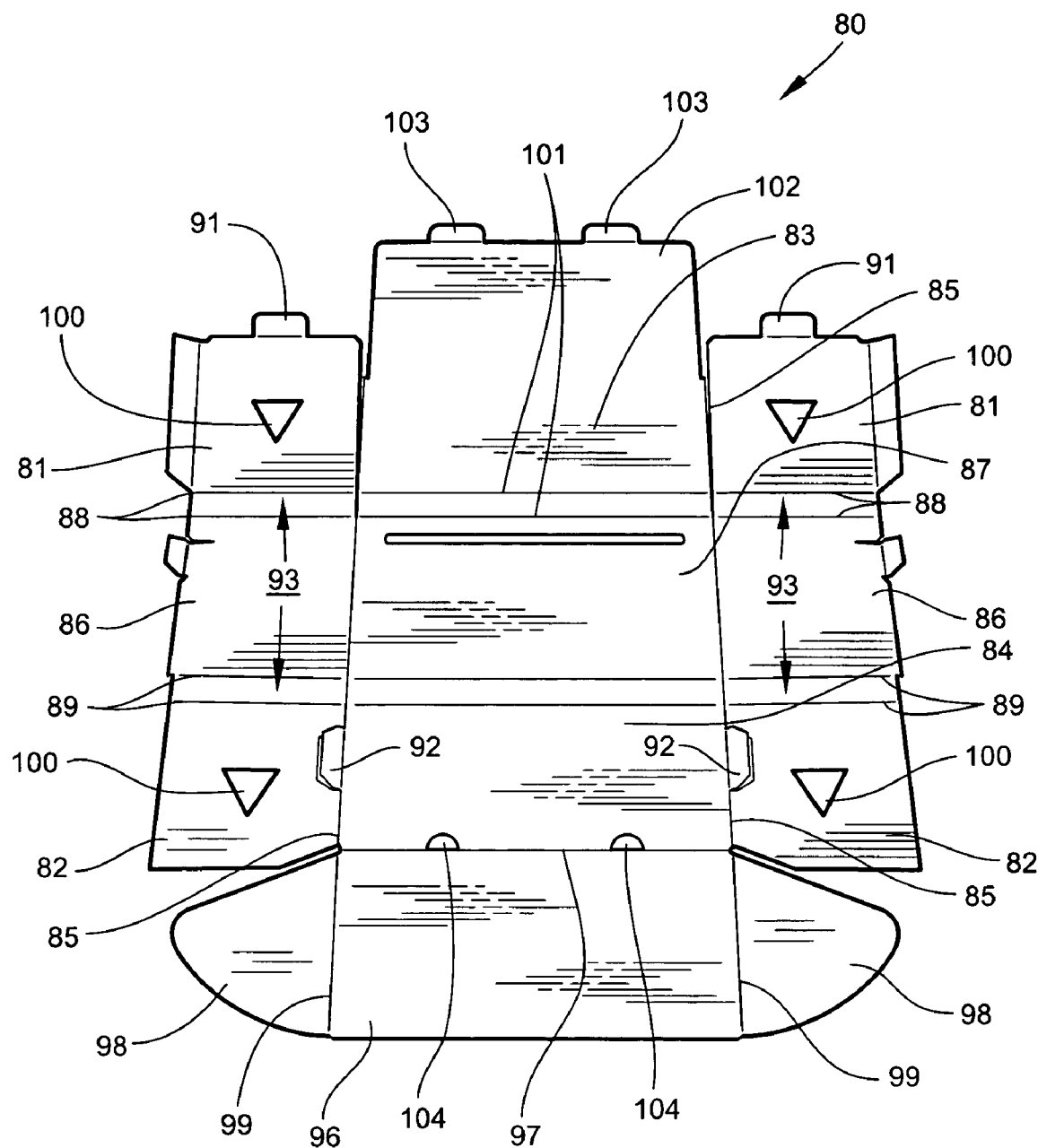
FIG. 8 is a top perspective view of a cart handle dispenser blank in an embodiment of the present invention.

A cart handle cover dispenser 50 of the present invention can be formed of materials that are sturdy, yet lightweight and inexpensive. For example, a cover dispenser 50 can be formed of corrugated paper or cardboard, or molded plastic. In embodiments, a cover dispenser 50 of the present invention can be formed from a flat blank 80 of material such as corrugated cardboard. As shown in FIG. 8, a dispenser blank 80 can be formed of a single sheet of material. The blank 80 can be corrugated such that the blank 80 is foldable along fold lines to assemble the dispenser 50 into a rectangular-shaped box.

To assemble the dispenser 50, for example, from the blank 80 shown in FIG. 8, top and bottom flaps 81, 82, respectively, on both sides of the blank 80 are disconnected from the top 83 and bottom 84 along respective perforation lines 85. The front flaps 86 on both sides are folded inward toward the front 87. (The front 87 comprises one of the sides 53 as shown in FIGS. 4-7.) The top flaps 81 are folded downward along two spaced apart fold lines 88 to be adjacent to the front flaps 86. The bottom flaps 82 are folded upward along two spaced apart fold lines 89 to be adjacent the overlapping front and top flaps 86, 81, respectively, on each side. The front, top, and bottom flaps 86, 81, 82, respectively, in overlapping adjacency create the sides 90 of the dispenser 50. The tabs 91 on the top flaps 81 and on the bottom 84 provide friction against the overlapped flaps 86, 81, and 82, to maintain the side walls 90 in overlapping position. Due to the spacer margin 93 between the top and front flaps 81, 86, respectively, and between the top and bottom flaps 81, 82, respectively, overlapping the front, top, and bottom flaps 86, 81, 82, respectively, forms a space 94 (as shown in FIG. 6) between the front flap 86 and the top and bottom flaps 81, 82, respectively, on each side 90 of the dispenser 50. In this manner, a double-walled side 90 is formed on each side of the dispenser 50, as shown in FIGS. 6 and 7. Once the sides 90 are thusly formed, the front 87 is folded upward along fold line 95 to a vertical position. The back 96 is folded upward along fold line 97 to a vertical position opposite the front 87. A tab 98 on each side of the back 96 is folded along fold lines 99 and inserted into the space 94 between the double walls of each side 90.

The top and bottom flaps 81, 82, respectively, include cut-outs 100, which, when the top and bottom flaps 81, 82, respectively, are folded into side-forming position, are aligned with the cut-outs 61 in the rod support members 60. The roll support rod 70 is loaded with rolls 20 of handle covers 30 and inserted through at least two rod support members 60, as shown in FIG. 2. The ends of the roll support rod 70 are then inserted into the cut-outs 100 in the side walls 90 (adjacent top and bottom flaps 81, 82, respectively). FIG. 7 shows the inside of a mostly assembled dispenser 50 containing the rod support members 60, rolls 20 of handle covers 30, and roll support rod 70 inserted into the side wall 90 cut-outs 100. The end of each of the continuous strips 40 of handle covers 30 is advanced from each roll 20 through the dispensing slot 55 in the front 87 of the dispenser 50, as shown in FIG. 7. Finally, the top 83 of the dispenser 50 is folded along fold lines 101 to a horizontal position over the top of the rolls 20 of handle covers 30. The top extension 102 is folded over to be adjacent with the outside of the dispenser back 96. The top tabs 103 are inserted into bottom slots 104 to close the dispenser 50.

In another embodiment of the present invention, cart handle covers can be dispensed from a personal dispenser (not shown). In one such embodiment, a personal dispenser comprises a rectangular container similar in design to the multi-roll dispenser described herein. A personal dispenser has dimensions to accommodate a roll 20 having a small number of covers 30, for instance 10-30 covers, on a continuous strip of cover 40 and backing materials 43. A personal dispenser can have a length to accommodate one such small roll 20 of covers 30, but can also be wide enough to contain more than one roll 20. A personal dispenser includes a dispensing slot 55 near the top 52 of one side 53 along the length 51 of the dispenser 50. The dispensing slot 55 is sized so as to allow the continuous strip of cover material 40 and backing material 43 to be pulled from a roll 20 through the slot 55. The dispensing slot 55 is positioned near the top 52 of the side 53 of the dispenser 50 so that once the continuous strip of cover material 40 and backing material 43 is pulled through the slot 55, the strip of material 40 outside the dispenser 50 is maintained outside the dispenser 50. This allows subsequent pulls of the strip of material 40 to obtain a handle cover 30. In an alternative embodiment, a personal dispenser has the shape of a cylinder, which may more readily fit into a purse, diaper bag, etc. Embodiments of personal dispensers allow a user to conveniently transport cart handle covers 30 to a retail store that may not have handle covers 30 available.

In embodiments of a system of the present invention, cart handle covers 30 are disposable. Once a user of a shopping cart is finished using the cart, the user can remove, by simply peeling, the cover 30 from the cart handle, and discarding the used cover 30 in an appropriate disposal receptacle. Alternatively, covers 30 can be left on cart handles by customers for later removal by store personnel. In addition, subsequent covers 30 can be placed over a cover 30 already applied to a cart handle. In this way, a cart handle can have covers 30 repeatedly applied, one on top of another, until a number of covers 30 are stacked on the handle. Then, store personnel can remove the stack of covers 30 by peeling the bottom cover 30 of the stack from the cart handle.

In another embodiment of the present invention, a system for covering a cart handle includes an auxiliary handle cover (not shown). An auxiliary handle cover of the present invention comprises a material, such as plastic or fiber, formed in a tubular shape. The tubular auxiliary handle cover has a slit along the length of the handle cover so that the cover can be press fit onto a cart handle. In embodiments, the auxiliary handle cover is sized to fit around a cart handle and yet be loose enough to roll about the cart handle. Such a loose fit allows a user to easily press the auxiliary handle cover onto a cart handle and to easily remove the cover from the handle when use of the cart is completed. Such a tubular handle cover allows more surface area for placement of advertising information. An auxiliary handle cover of the present invention may be disposable or reusable.

In another embodiment of the present invention, a system for covering a cart handle comprises a cart handle cover that includes a baby cradle (not shown). Such a system can include a handle cover portion similar to a handle cover 30 of the present invention described herein. In addition, such a system includes a baby cradle portion having a front, a back, a bottom, and opposing sides. The front portion includes two cut-outs through which a baby's feet and legs can be placed. The baby cradle portion is sized to accommodate a baby mature enough to sit up independently but not large enough to fit securely in a child seat area in a shopping cart. The baby cradle portion can be integral with the handle cover portion. Accordingly, the combination handle cover-baby cradle system may be provided releasably adhered to a backing material 43 in a roll 20 that can be dispensed from a dispenser 50 of the present invention. In other embodiments, a handle cover-baby cradle system would be provided via means other than such a dispenser 50. A handle cover-baby cradle system of the present invention can be made in various sizes to accommodate infants of different ages and sizes.

In operation of one embodiment, the handle cover-baby cradle system can be pulled from a dispenser 50 and peeled from the backing material 43. The handle cover portion is placed around a cart handle. The front of the baby cradle portion extends from an edge of the handle cover 30. The baby cradle portion can include markings to show a user how to fold the flat baby cradle portion into an operable baby cradle for use in the child seat area of a shopping cart. For example, once the handle cover portion is wrapped around a cart handle, two folds are made along the baby cradle front-bottom junction marked with a first fold indicator and along the bottom-back junction marked with a second fold indicator. Then, the two sides are folded up along the side-bottom junctions, marked with third and fourth fold indicators, respectively, to form a seat area. The edges of the sides, front portion, and back portion juxtaposed with each other include a means for securing the juxtaposed edges together. The means for securing the edges together can include, for example, an adhesive-bearing extension at the front and the back of each side that overlaps the front and back portions, respectively. The side extensions can be folded over the respective front and back portions and pressed together to cause the adhesive to secure the side extensions, and thus the sides, to the front and back portions. In other embodiments, the means for securing the edges together can include self-locking tabs. The handle cover-baby cradle system is then in proper position to protect the hands of the person moving the cart from possible contamination on the handle. The handle cover-baby cradle system also protects a baby placed in the baby cradle by providing greater stability for the baby in the child seat area, as well as a sanitary barrier on the handle for when the baby touches the handle with her/his hands and/or mouth.

In other embodiments, a handle cover-baby cradle system of the present invention comprises a corrugated cardboard blank (not shown) that can be folded into an assembled unit.

Embodiments of a system 10 for covering a cart handle of the present invention are useful for advertising purposes. Advertising information can be displayed on the cart handle covers and/or the dispenser. The space on a cart handle cover 30 of the present invention can be utilized by the particular retail store in which the covers 30 are being used to advertise for that store. For example, a large discount store could advertise weekly specials on the covers 30. Alternatively, a retail store could sell space on the covers 30 it provides to its customers to preferred vendors, or to the highest bidding vendor, to advertise those vendors' products and/or specials. In other embodiments, the covers 30 can have coupons printed on them that offer rebates on purchases. Such rebate coupons may be redeemable in the store. Likewise, cover dispensers 50 can include advertising information on the outer surfaces of the dispensers 50. Advertising on handle covers 30 and cover dispensers 50 can provide additional revenue to a business. As such, a business could recover its cost for providing the handle covers 30 from paying advertisers, and possibly profit from the advertising.

Cart handle covers 30 of the present invention can be provided at no charge to customers as a gesture of good will in showing the concern of a business for its customers' health and well-being. However, in embodiments of the present invention, a cart handle cover system 10 can include a dispenser 50 having a means for controlling dispensing of a handle cover 30 (not shown). In embodiments, the present invention can include a means for collecting payment for purchase of a cart handle cover 30 (not shown). For example, a dispenser 50 can include a coin-operated mechanism by which when a certain denomination of a coin, or combination of coins, is inserted into a coin-receiving slot, a locking device on the roll 20 of covers 30 is released. The roll 20 will then rotate only the distance necessary to dispense one cover 30. Each time a cover 30 is desired by a customer, the customer must insert the correct coin value into the slot to receive a handle cover 30. In this manner, a business is provided with a means for directly recovering its cost for providing the handle covers 30, or even to profit from doing so.

Embodiments of the present invention include a method for protecting against cross-contamination from shopping cart handles. Such an embodiment can comprise providing a plurality of cart handle covers 30 formed from a continuous strip of cover material 40 having an adhesive 41 applied to a back side 42 of the cover material 40. The back side 42 of the cover material 40 is releasably adhered to a backing material 43. The continuous strip of cover material 40 is wrapped about a tubular core 21 to form a roll 20. A dispenser 50 for dispensing the covers 30 from the roll 20 is also provided. At least two rod support members 60 are spaced apart inside the dispenser 50. Each rod support member 60 has a centrally-located cut-out 61. A roll support rod 70 extends through the cut-outs 61 of the rod support members 60 along the length 51 of the dispenser 50. The tubular core 21 of the roll 20 of handle covers 30 is rotatingly positioned about the roll support rod 70. The dispenser 50 includes a dispensing slot 55 near the top 52 on one side 53 along the length 51 of the dispenser 50. The dispenser 50 can be sized and configured to provide a plurality of rolls 20 of cart handle covers 30 in the dispenser 50.

The method further includes advancing the continuous strip of handle covers 40 through the dispensing slot 55. Once a handle cover 30 is accessible outside the dispenser 50, a user (a customer) peels one of the covers 30 from the backing material 43. The user then applies the cover 30 to a cart handle.

In embodiments of such a method, the continuous strip of cover material 40 can include a marking 47 at the end 48 of each one of the covers 30. The continuous strip 40 of handle covers 30 is advanced through the dispensing slot 55 to a point where the marking 47 appears such that the user exposes only a single handle cover 30 at a time. In embodiments of such a method, a user disposes the cover 30 applied to the cart handle after using.

Although the present invention has been described with reference to particular embodiments, it should be recognized that these embodiments are merely illustrative of the principles of the present invention. Those of ordinary skill in the art will appreciate that a cart handle cover system of the present invention may be constructed and implemented in other ways and embodiments. Accordingly, the description herein should not be read as limiting the present invention, as other embodiments also fall within the scope of the present invention.

What is claimed is:

1. A cart handle cover system, comprising:
a plurality of cart handle covers formed from a continuous strip of cover material having an adhesive applied to a back side of the cover material, the back side of the cover material releasably adhered to a backing material, the continuous strip of cover material wrapped about a tubular core to form a roll;
a dispenser for dispensing the covers from the roll;
at least two rod support members spaced apart inside the dispenser, each rod support member having a centrally-located cut-out comprising a shape;
a roll support rod having the same shape as and extending through the cut-outs of the at least two rod support members along a length of the dispenser, the tubular core of the roll of handle covers rotatingly positioned about the roll support rod;
a dispensing slot near the top on one side along the length of the dispenser, the continuous strip of handle covers adapted for advancing through the dispensing slot such that a user can peel one of the covers from the backing material for application to a cart handle; and
a marking at the end of each one of the covers in the continuous strip of cover material to indicate the distance for advancing the strip through the dispensing slot in order to peel a single cover from the backing material.

2. The cart handle cover system of claim 1, wherein the continuous strip of cover material is scored to form the plurality of cart handle covers, each cover having a predetermined size.

3. The cart handle cover system of claim 2, wherein the predetermined size of each cover comprises a width and a length sufficient to completely cover the cart handle.

4. The cart handle cover system of claim 1, wherein the dispenser and the dispenser slot each comprise a length sufficient to contain a plurality of rolls of handle covers.

5. The cart handle cover system of claim 1, further comprising a means for controlling dispensing of the cart handle covers.

6. The cart handle cover system of claim 1, wherein each of the plurality of cart handle covers is disposable.

7. A cart handle cover system, comprising:

a plurality of cart handle covers formed from a continuous strip of cover material having an adhesive applied to a back side of the cover material, the back side of the cover material releasably adhered to a backing material, the continuous strip of cover material scored to form the plurality of cart handle covers and wrapped about a tubular core to form a roll;

each cover having a predetermined size comprising a width and a length sufficient to completely cover a cart handle;

a marking at the end of each cover to indicate the distance for advancing the strip in order to peel a single cover from the backing material;

a dispenser for dispensing the covers from the roll, the dispenser having a rectangular shape;

at least two rod support members spaced apart inside the dispenser, each rod support member having a centrally-located cut-out, the cut-out having a geometric shape;

a roll support rod having the same shape as and extending through the cut-outs in the at least two rod support members along a length of the dispenser, the tubular core of the roll of handle covers rotatingly positioned about the roll support rod; and a dispensing slot near the top on one side along the length of the dispenser, wherein the dispenser and the dispenser slot are each adapted to contain and dispense a plurality of rolls of handle covers, and wherein the continuous strip of handle covers is adapted for advancing through the dispensing slot such that a user can peel one of the covers from the backing material for application to the cart handle.

8. The cart handle cover system of claim 7, further comprising advertising information displayed on the cart handle covers or on the dispenser.

9. A method for protecting against cross-contamination from shopping cart handles, comprising:

providing a plurality of cart handle covers formed from a continuous strip of cover material having an adhesive applied to a back side of the cover material, the back side of the cover material releasably adhered to a backing material, the continuous strip of cover material wrapped about a tubular core to form a roll; a marking at the end of each one of the covers in the continuous strip of cover material; a dispenser for dispensing the covers from the roll; at least two rod support members spaced apart inside the dispenser, each rod support member having a centrally-located cut-out having a shape; a roll support rod having the same shape as and extending through the cut-outs of the at least two rod support members along a length of the dispenser, the tubular core of the roll of handle covers rotatingly positioned about the roll support rod; and a dispensing slot near the top on one side along the length the dispenser;

advancing the continuous strip of handle covers through the dispensing slot;

peeling one of the covers from the backing material; and applying the cover to a cart handle.

10. The method of claim 9, further comprising advancing the continuous strip of handle covers through the dispensing slot to a point where the marking appears.

11. The method of claim 9, further comprising disposing of the cover applied to the cart handle after using.

12. The method of claim 9, further comprising providing a plurality of rolls of cart handle covers in the dispenser.

* * * * *